Patented Aug. 31, 1937

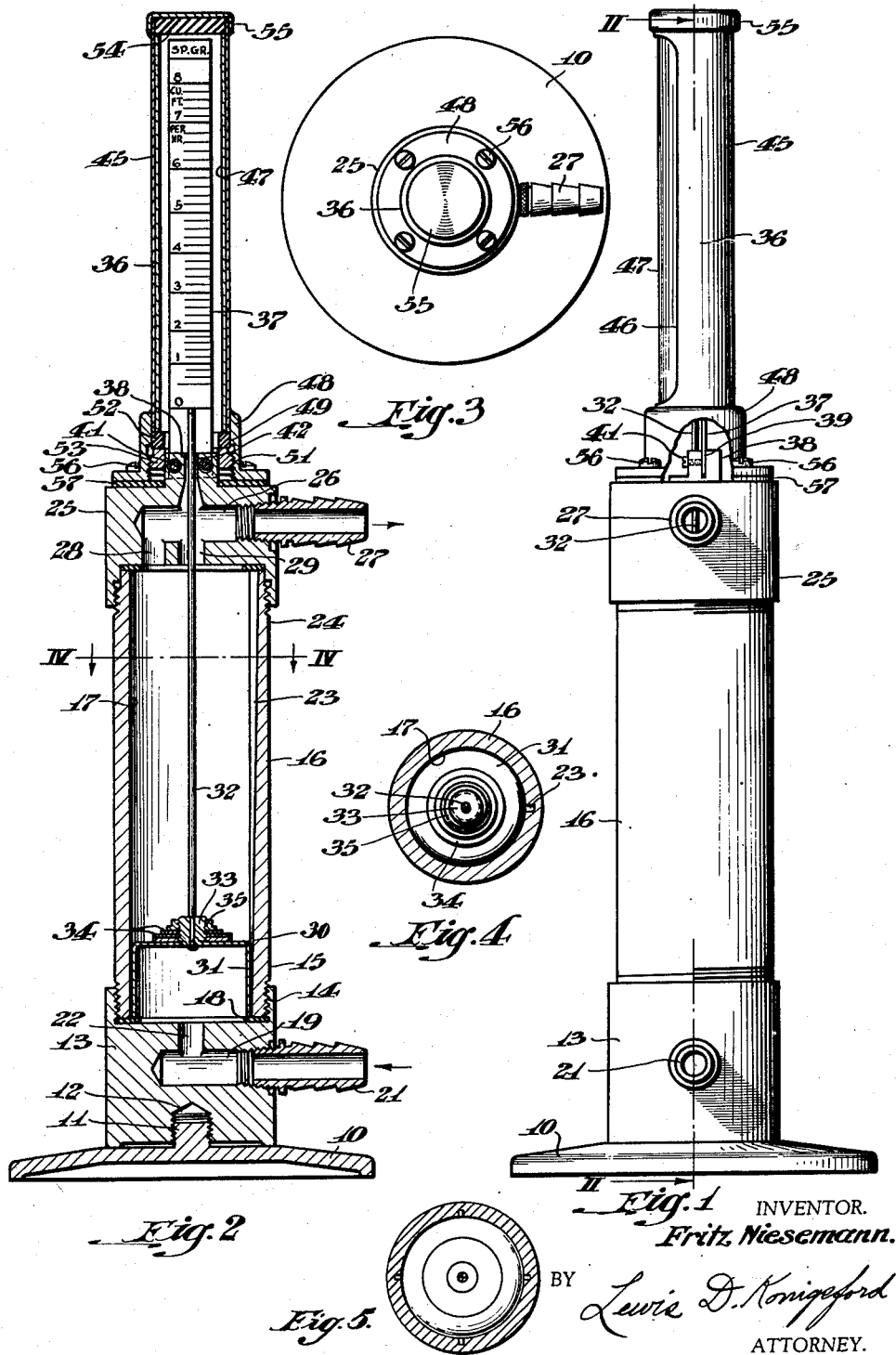

2,091,792

UNITED STATES PATENT OFFICE 2,091,792

FLOW INDICATOR

Fritz Niesemann, Pittsburgh, Pa., assignor to Pittsburgh Equitable Meter Company, Pittsburgh, Pa., a corporation of Pennsylvania Application May 16, 1935, Serial No. 21,842

1 Claim. (Cl. 73—208)

This invention relates to flow meters or indicators, and relates particularly to flow meters of the pressure balanced piston type in which the weight of a piston is balanced by the differential pressure of fluid flowing around or under the piston.

It is an object of the present invention to provide a device of this type in which the direction of flow of fluid remains substantially unchanged after passing the piston so as to eliminate undesired whirling and eddy currents in the fluid after it passes the piston.

Still another object is the provision of a flow meter which is simple in construction and is rugged, so that it may be used for adjusting various fluid consuming devices in situ.

These and other objects will be apparent from a consideration of the following description taken in connection with the annexed drawing in which:

Figure 1 is an elevation with parts broken away of a preferred embodiment of the invention;

Figure 2 is a section taken on line II—II of Figure 1;

Figure 3 is a plan view of the embodiment shown in Figure 1;

Figure 4 is a section taken on line IV—IV of Figure 2; and

Figure 5 is a section similar to Figure 4 of a modification.

Referring to the drawing, there is shown a base plate 10 having an upstanding threaded lug 11 thereon which is received in a threaded aperture 12 of the cylindrical base member 13, whereby the base plate and base member are held together. The base member 13 is bored and threaded as indicated at 14 to receive one threaded end 15 of a tube 16 having a uniform bore 17 therethrough, a gasket 18 providing a fluid tight seal therebetween. The base member 13 is laterally bored and threaded to provide an inlet 19 and receives an inlet nipple 21 adapted to be attached to the gas pipe or other suitable source of fluid to be measured. The interior of tube 16 communicates with the inlet 19 by means of a vertical bore 22 in the base member 13. The cylinder 16 has a blind tapered slot or recess 23 formed in the internal wall which extends for substantially the full length of the cylinder and has a greater cross sectional area as it approaches the outlet end, the slot being shown preferably as deeper at the outlet end 24 of the cylinder than at the inlet end, and if desired, the blind wall thereof may be formed on a radius as shown. The tube 16 is threaded at the outlet end 24 and receives a cover member 25 thereon which has a similar lateral bore 26 therein to receive the outlet nipple 27 and which communicates with the interior of the cylinder by one or more passages 28 and 29.

A piston 31, which may be hollow as shown, is located in the bore 17 of tube 16 and forms a close sliding fit with the bore 17. It has secured thereto in any suitable manner, as by peening, an indicating stem 32 which extends through the bore 29 in the top cover member 25. The piston 31 has an integral threaded lug 33 extending therefrom through which the indicator rod 32 passes, and one or more washers 34 may be placed thereon and locked in position by the nut 35 to adjust the weight of the piston. The piston 31 forms a closure for the wall of recess 23 so that in effect an opening 30, the effective area of which is varied by the position of the piston, is provided between the bottom and top of the piston. While I have shown one such slot 23 in Figures 2 and 4, it will be understood that any desired number of slots may be employed circumferentially spaced around the tube 16 as shown in Figure 5.

A sight glass assembly indicated generally by the numeral 36 is secured to the top of cover member 25, into which extends the scale 37. The cover member 25 has an integral lug 38 extending from the top which is divided by a slot 39, and the scale plate 37 is placed in this slot and secured in position by screws 41 or other suitable means. A hole 42 extends through the cover 25 through which the indicator rod 32 passes in front of the scale.

The sight glass assembly 36 comprises an open ended metal tube or armor 45 having a portion cut away as indicated at 46, and a glass tube 47 is secured therein, the movement of the end of indicator rod 32 being visible therethrough. The tube 45 is secured at its bottom in a bore 49 of holder 48 by sweating or in any other suitable manner. The holder is counterbored and threaded as indicated at 51, and a gasket 52 is held in sealing relation against the glass tube 47 by a threaded gasket screw 53. At the top a gasket 54 is held in sealing relation against the end of the tube 47 by a cover 55 which is sweated over the end of tube 45 or is secured thereto in any other suitable manner. The tube assembly 36 is secured to the cover member 25 by screws 56, a gasket 57 being interposed to provide a fluid tight joint.

The operation of the apparatus now will be described. The fluid to be measured, for example, fuel gas, enters from inlet 19 into the bore 17 under the piston 31, and as the piston 31 fills the bore, the gas escapes through opening 30 to the top of the piston. From thence it continues its flow through openings 28 and 29 into outlet passage 26, outlet nipple 27 being connected to the burner of a gas refrigerator or any other appliance. The greater the flow of gas to the indicator the greater will be the movement of piston 31 in the bore 17 which moves upwardly until a sufficient opening is provided to just balance the weight of the piston. As the slot 23 provides practically the only escape of gas from beneath the piston, and as this slot is tapered, it will be seen that the higher the piston is lifted the greater will be the area of opening 30 and the greater will be the flow therethrough until a condition is reached at which the piston is balanced at a constant position, and at this position the flow of gas through opening 30 is constant. The position of the piston 31 therefore is an index of the flow through the indicator. The indicator rod extends through the cover 25 in front of the scale 37, and its end, which may be colored for easier visibility, indicates the position of the piston. By graduating the scale 37 in units of flow the apparatus will indicate directly the rate of flow of gas therethrough.

It will be observed that the outlet 29 from tube 16 is substantially in the direction of flow of fluid through the area 30, so that whirling and eddy currents above the piston, which would affect the gas pressure therein, are reduced or eliminated. The present invention is particularly suitable for measurement of small flows, such as are involved in setting the gas flame for gas refrigerators, etc., but can also be used for measurement of large flows such as are involved in water heaters or the like. The invention may be embodied in other specific forms without departing from the spirit or essential characteristics thereof. The present drawing and description is intended to be illustrative of the invention, the scope of the invention being defined by the appended claim and all changes which come within the meaning and range of equivalents are intended to be embraced therein.

What is claimed and desired to be secured by United States Letters Patent is:—

A flow indicator comprising a base, a tube secured in said base, an inlet in said base communicating with said tube at its lower end, said tube having a blind slot in its interior surface of gradually increasing cross section area from one end to the other, a piston in said tube, a cap for the upper end of the tube having a central outlet opening therethrough, an indicator secured to said piston and extending through said outlet, a scale secured to said cap and cooperating with said indicator, and a tube having a sight opening therein having a transparent closure enclosing said scale.

FRITZ NIESEMANN.